(12) United States Patent
Kishima

(10) Patent No.: US 6,787,211 B2
(45) Date of Patent: Sep. 7, 2004

(54) OPTICAL RECORDING MEDIUM AND ITS MANUFACTURING METHOD

(75) Inventor: Koichiro Kishima, Kanagawa (JP)

(73) Assignee: Sony Corporation, Tokyo (JP)

(*) Notice: Subject to any disclaimer, the term of this patent is extended or adjusted under 35 U.S.C. 154(b) by 229 days.

(21) Appl. No.: 09/943,832

(22) Filed: Aug. 30, 2001

(65) Prior Publication Data

US 2002/0057645 A1 May 16, 2002

(30) Foreign Application Priority Data

Aug. 31, 2000 (JP) .................................. P2000-263497

(51) Int. Cl.⁷ .................................................. B32B 3/02
(52) U.S. Cl. ...................... 428/64.1; 428/64.4; 428/702; 430/270.11
(58) Field of Search ........................... 428/64.1, 64.4, 428/688, 702, 913; 430/270.11, 495.1, 945

(56) References Cited

U.S. PATENT DOCUMENTS

| 4,981,743 A | * | 1/1991 | Ho ................................. 428/64 |
| 4,983,505 A | * | 1/1991 | Higuchi ....................... 430/495 |
| 5,244,706 A | * | 9/1993 | Hirata ............................ 428/64 |
| 5,972,457 A | * | 10/1999 | Matsuishi .................. 428/64.1 |
| 6,291,047 B1 | * | 9/2001 | Kobayashi .................. 428/64.1 |
| 2002/0004118 A1 | * | 1/2002 | Kishima ..................... 428/64.4 |

FOREIGN PATENT DOCUMENTS

| EP | 89304234 | 11/1989 |
| EP | 0652555 | 5/1995 |
| EP | 1022316 | 7/2000 |

* cited by examiner

*Primary Examiner*—Elizabeth Mulvaney
(74) *Attorney, Agent, or Firm*—Sonnenschein, Nath & Rosenthal LLP

(57) ABSTRACT

To solve the problem of reliability of a flat film in an optical recording medium due to repelling, and a problem of the yield. An optical recording medium for executing at least one of recording and reproduction of information by light irradiation, comprising a film formation layer having at least a recording layer, with the surface on the light irradiation side provided as a minute rugged surface, on a substrate with a minute concave-convex portion formed on the surface on the light irradiation side, wherein a light transmissible flat film having a transmissivity with respect to the irradiation light is formed on the film formation layer via a hydrophilic material film having a hydrophilic property, filling the minute rugged surface of the film formation layer surface so as to have a flat surface, is provided.

20 Claims, 6 Drawing Sheets

OPTICAL RECORDING MEDIUM AND ITS MANUFACTURING METHOD

RELATED APPLICATION DATA

The present application claims priority to Japanese Application(s) No(s). P2000-263497 filed Aug. 31, 2000, which application(s) is/are incorporated herein by reference to the extent permitted by law.

BACKGROUND OF THE INVENTION

1. Field of the Invention

The present invention relates to an optical recording medium and a method of manufacturing the optical recording medium, and more particularly to an optical recording medium which is suitable for application to the case of use in a near field state in which a distance between an optical lens and the optical recording medium is caused to approximate to 200 nm or less and a method of manufacturing the optical recording medium.

2. Description of the Related Art

As an optical recording medium, such as an optical disc, there are so-called ROM type optical discs dedicated for reproduction with a pit and a tracking groove formed preliminarily on a substrate, and so-called RAM type optical discs for recording and reproduction such as a phase change type optical disc and a magneto-optic disc with an information recording layer formed on a substrate with the above-mentioned pit and tracking groove formed.

The phase change type optical disc performs recording of information by changing the phase of a recording layer between an amorphous state and a crystalline state by irradiation of laser light, and reproducing of the information by optically detecting a change in the refractive index thereof as a change in reflectance.

Moreover, the magneto-optic disc performs recording of information by changing the magnetization state of a recording layer by application of an external magnetic field or by laser irradiation, and reproduction of the information by rotating a polarizing angle of the reproduction laser beam according to the magnetization state by the magneto-optic effect, such as the Kerr effect, and detecting the rotation.

These optical discs have a film formation layer of, for example, a recording layer, a reflection film, a dielectric film, or the like on a light transmissible substrate such that the information can be recorded in or reproduced from the recording layer by having a laser beam thereupon from the substrate side as mentioned above.

The recording density of an optical disc, in general, depends on the laser spot size of a light source so that the recording density can be made higher with a smaller laser spot size. The laser spot size is proportional to $\lambda/NA$ ($\lambda$: laser light beam wavelength, NA: numerical aperture of an objective lens). Therefore in order to increase the recording density of an optical recording medium, it is required to have a short laser beam wavelength, and a high NA.

As a method for realizing a high NA, recently, a near field optical disc with a 200 nm or less distance between an optical disc and an optical lends has been studied elaborately. The present inventors have reported their study of achieving an NA>1 optical parameter using a solid immersion lens (SIL) (for example, I. Ichimura, K. Kishima, K. Osato, K. Yamamoto, Y. Kuroda, K. Saito, "Near-Field Phase-Change Optical Recording of 1.36-Numerical-Aperture", J. Appl. Phys. Vol. 39, 962–967 (2000)).

In the case of achieving a high NA in an optical system, a problem of a large comatic aberration is generated. The comatic aberration is proportional to (skew angle)×(NA)3× (distance of transmission of a laser light beam in an optical disc) (the skew angle denotes the tilt angle with respect to the optical axis of an optical disc).

As mentioned above, according to conventional optical discs, since a laser light beam is irradiated to a recording layer from the substrate side, the substrate should be thin in order to reduce the comatic aberration. As for the substrate of an optical disc, a plastic injection molding substrate is used in large numbers, and thus it is problematic to make the substrate thinner with high accuracy in terms of production as well as strength.

On the other hand, there has been spread a recording and/or reproducing method for considerably reducing a distance to the recording layer of a laser beam by employing a recording or reproducing manner in which the laser beam irradiation during recording or reproduction is carried out on the protective film side formed on the recording layer on the opposite side to the substrate side of an optical disc. In the case of this method, since the comatic aberration can be reduced, it is preferable for achieving a high NA.

In the near field optical disc device in which a distance between an optical system such as an optical lens and an optical disc is caused to approximate to 200 nm or less, if a projection such as a convex defect is present on the surface of the optical disc, the optical system or the surface of the optical disc might be damaged. In the optical disc to be used for a near field, accordingly, the surface is to be flattened with high precision. In particular, no projection on the surface is strictly required.

Moreover, since the surface reflection can be reduced from a specific layer, or the multiple interference with respect to a specific layer can be adjusted by forming a predetermined protection layer consisting of a dielectric material on the surface of an optical disc used in the near field, the MTF (Modulation Transfer Function) can be improved. (I. Ichimura, K. Kishima, K. Osato, K. Yamamoto, Y. Kuroda, K. Saito, "Near-Field Phase-Change Optical Recording of 1.36-Numerical-Aperture", J. Appl. Phys. Vol. 39, 962–967 (2000).)

The optical disc has a recording manner such as groove recording in which information is recorded on a recording layer in a groove for tracking, land recording in which information is recorded in a recording layer on a land between adjacent grooves or land-groove type recording in which information is recorded in both recording layers of the groove and the land. In the case of the land-groove recording, a recording density can be increased.

For example, in the case in which such land-groove recording is to be carried out, a film formation layer having the recording layer is formed along a fine concave-convex surface such as a pit or a groove which is formed on the substrate, that is, such that a concave-convex surface conforming to the shape of the surface of the concave-convex portion is generated. In this case, if the protective layer for improving the MTF, for example, is formed by sputtering as in the conventional method, the surface concave-convex portion cannot be relieved by the protective layer. In other words, a concave-convex portion is generated on the surface of the protective layer by the land and the groove, for example, so that the distance between the optical system and the surface of the optical disc is varied on the land and the groove. Consequently, their optical bonding becomes non-uniform so that a predetermined optical characteristic to be desired cannot be obtained.

For the disadvantage, the present inventors have proposed a flat layer to be formed by a spin coat method, capable of polishing the surface in the official gazettes of Japanese Patent Application Nos. 11-186842, 11-19674, and 2000-203967, or the like.

However, in the case of forming a flat layer by the spin coat method, the film shape thereof can be affected easily by the physical property value of the base material. In the case the surface tension of the base material is lower than the surface tension of the liquid for the spin coat, the liquid is repelled so that a flat layer with an even film thickness cannot be formed in some cases. In particular, in the case the flat layer thickness is thin, even if it is not repelled in the state immediately after the application by the spin coat, the liquid may be repelled in a subsequent baking step. Furthermore, even in the case it is not repelled, the film thickness may be uneven.

In the optical recording medium, particularly, the optical disc, the shape thereof is equivalent to that of a CD (Compact Disc) and is set to be a circular shape having a central hole in many cases.

In the optical disc, moreover, the film formation layer including the recording layer contains a material layer which comes in contact with outside air and is thereby corroded easily. During the formation of the film formation layer, for example, the sputtering, therefore, a non-formation region in which the film formation layer is not formed is provided in the outer peripheral edge portion of the optical disc and the vicinity of the central hole, and the outer peripheral side edge of the film formation layer based on the non-formation region and the central side edge are covered so that a protective film or cover layer formed of an ultraviolet thermosetting resin or the like is coated through spin coating or the like.

Also in the optical recording medium to be used in the near field, as shown in the schematic sectional view of FIG. 12, a light transmission flattening film 4 is formed to cover the outer peripheral side edge of the film formation layer 3 and the central side edge over the film formation layer 3 on the substrate 1 where the fine concave-convex portion 2 is formed.

In the optical recording medium to be used in the near field, however, the light transmission flattening film 4 is formed as a very thin film to have a thickness of 400 nm or less or 100 nm or less. Consequently, even if the light transmission flattening film 4 is coated by the spin coating, it is impossible to disregard the influence of a difference-in-height portion 10 formed by the central side edge of the film formation layer 3 and the outer peripheral side edge on the surface of the light transmission flattening film 4 which has not made troubles in the conventional optical disc.

Furthermore, since the central side edge of the film formation layer 3 and the outer peripheral side edge, that is, the end face of particularly the recording layer as exposed to the side portion of the difference-in-height portion 10 has a surface tension smaller than that of the flat film, the flat film spin coat liquid can easily be repelled at the difference-in-height portion 10. In particular, in the case the flat film thickness is substantially the same as the height of the difference-in-height portion 10, furthermore, in the case it is lower than that, the spin coat liquid is repelled further remarkably so that not only deterioration of the optical recording medium reliability and deterioration of the yield, but also radial thickness irregularity called striation is generated disturbing the surface flatness of the flat film, and thus a damage problem arises in the above-mentioned optical system.

As described above, moreover, in the case in which a blue laser beam is used by a reduction in a wavelength of the irradiated laser beam in order to increase the recording density, it is necessary to select a material having a low light absorption rate for the blue wavelength light in order to obtain excellent reproducing characteristics or recording and reproducing characteristics in the light transmission flattening film.

As a light transmission flattening film having a low absorption rate for the blue wavelength light, an inorganic material is preferable. In order to obtain an excellent flattening property, moreover, spin coating is preferable for a method of coating the light transmission flattening film. Conventionally, the coating solution is repelled. Consequently, there has been a problem in that reliability, yield and the like are deteriorated.

SUMMARY OF THE INVENTION

It is an object of the present invention to provide an optical recording medium having excellent reproducing characteristics or recording and reproducing characteristics and capable of enhancing reliability and yield, and a method of manufacturing the optical recording medium.

The present invention provides an optical recording medium for carrying out at least one of record and reproduction of information by light irradiation, comprising a substrate having a concave-convex portion formed on a main surface on a side where the light irradiation is to be carried out, a film formation layer provided with a concave-convex surface corresponding to the concave-convex portion which includes at least a recording layer over the main surface of the substrate, and a light transmission flattening film having a transmittance to the irradiated light which is formed on the film formation layer through a hydrophilic material film, wherein the concave-convex surface on a surface of the film formation layer is filled with the light transmission flattening film and is thus flattened.

In the present invention, the hydrophilic material designates a material layer having a surface tension of 40 [dyne/cm] or more.

Moreover, the present invention provides a method of manufacturing an optical recording medium for carrying out at least one of record and reproduction of information by light irradiation, comprising the steps of manufacturing a substrate having a concave-convex portion formed on a main surface on a side where the light irradiation is to be carried out, forming a film formation layer having at least a recording layer, forming a light transmission flattening film having a transmittance to the irradiated light and filling in a concave-convex surface generated on a surface of the film formation layer to flatten the surface, and forming a hydrophilic material film on a surface where the light transmission flattening film is to be formed before the step of forming a light transmission flattening film.

As mentioned above, according to the optical recording medium of the present invention, by forming a hydrophilic material film on the light transmissible flat film formation surface, in particular, on the surface with the bonding strength thereof being important, peel-off of the attached light transmissible flat film, and thickness unevenness can be avoided so as to improve the reliability.

Moreover, according to the production method of the present invention, by forming a hydrophilic material film, and thereafter forming a light transmissible flat film at the time of the light transmissible flat film, the phenomenon of repelling of the flat film formation material liquid also at the film formation layer rim part gap at the time of formation of the light transmissible flat film can be avoided.

According to the present invention, the light transmission flattening film formed of an inorganic material having a low absorption rate for a blue light having a short wavelength can be formed with an excellent surface property and a high adhesion strength by spin coating.

DESCRIPTION OF THE PREFERRED EMBODIMENTS

Embodiments of an optical recording medium and a production method for an optical recording medium according to the present invention will be explained.

First, an optical recording medium will be explained.

[Optical Recording Medium]

An optical recording medium according to the present invention is an optical recording medium for executing at least one of recording and reproduction of information by light irradiation, capable of having various kinds of the optical recording medium configurations, such as a phase change type optical recording medium, a magneto-optic recording medium utilizing the magneto-optic effect, and a pigment recording medium having a pigment recording layer.

Moreover, an optical recording medium according to the present invention may adopt various forms such as a disc, a card, and a sheet.

Figure 1:
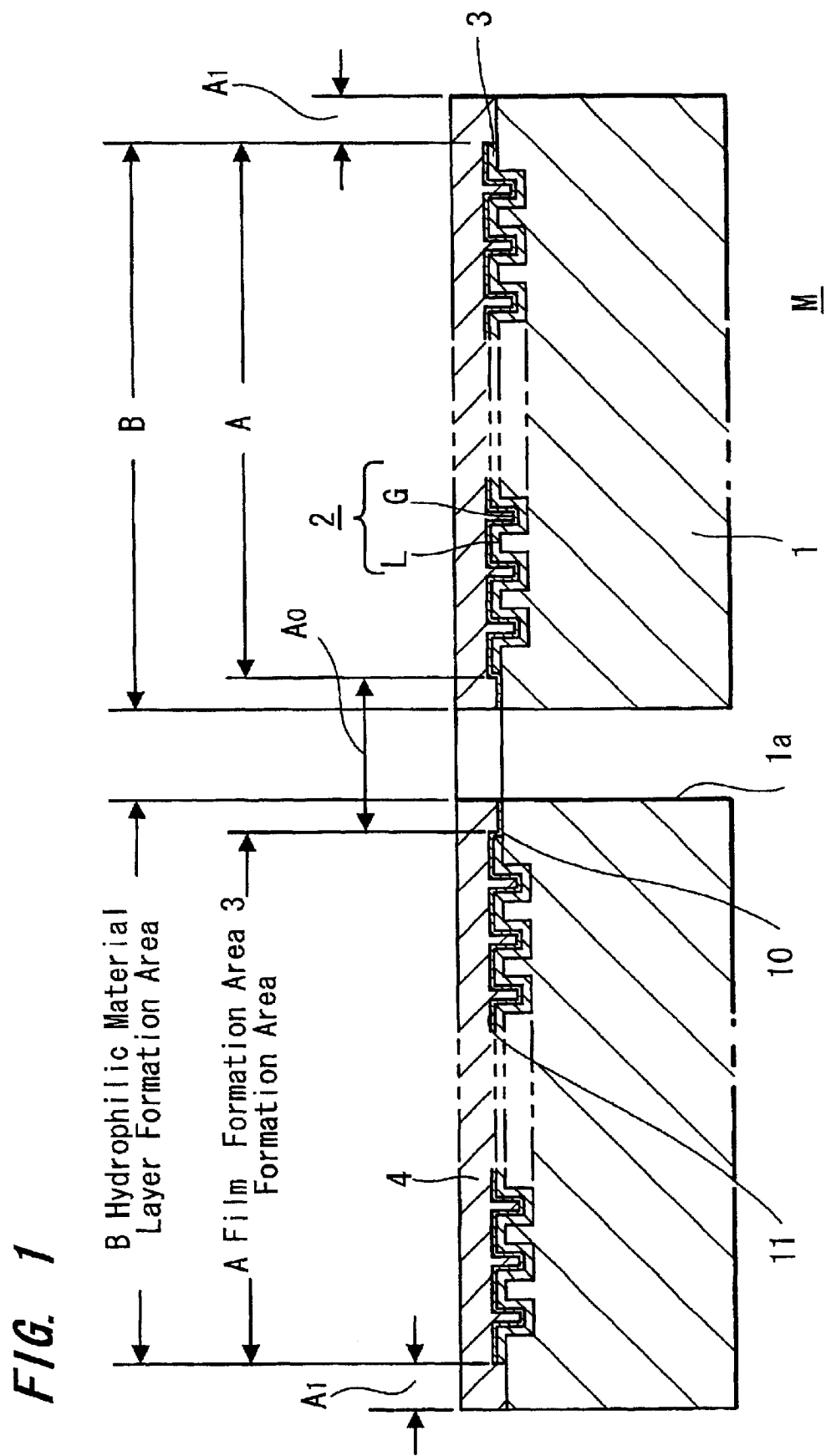
FIG. 1 is a schematic cross-sectional view of an embodiment of an optical recording medium according to the present invention.

FIG. 1 is a schematic cross-sectional view of the basic configuration of an optical recording medium M with a disc-like disc configuration.

In this case, a substrate 1 having a central hole 1a, with a minute concave-convex portion 2 including various information pits, tracking intermittent or continuous grooves G, and lands L formed on the surface, is provided.

Furthermore, a film formation layer 3 having at least a recording layer is formed on the surface with the minute concave-convex portion 2 formed, of the substrate 1.

That is, the film formation layer 3 is provided by laminating, for example, a reflection film, an information recording layer, a dielectric layer, and further, a material layer to be the base layer of a flat film, or the like. The film formation layer 3 provided so as to cover the minute concave-convex portion 2 formation range of the substrate 1, has a ring-like non-formation area $A_0$ without formation of the film formation layer 3 in the central part, that is, the part with the central hole 1a formed of the substrate 1, and a predetermined width around the same, and a ring-like non-formation area $A_1$ similarly without formation of the film formation layer 3 in the circumferential rim part by a predetermined width. In the part other than the areas $A_0$ and $A_1$, a ring-like formation area A with the film formation layer 3 formed thereon, is provided.

A minute concave-convex portion is produced on the film formation layer 3 surface, reflecting the minute concave-convex portion 2 of the substrate 1 surface.

A surface flat film 4 is formed, covering the film formation layer 3. In the present invention, a hydrophilic material film 11 having a hydrophilic property is formed below the surface flat film 4 in the present invention.

As mentioned above, the hydrophilic material film 11 has a 40 [dyne/cm] or more surface tension. The hydrophilic material film 11 is formed so as to cover the film formation layer 3, and the area B across the substrate 1 surface at least in the non-formation area $A_0$ in the central part of the film formation layer 3, that is, the end face of a difference-in-height portion 10 in the inner circumferential rim of the film formation layer 3.

A light transmissible flat film 4 fills the rugged surface of the film formation layer 3 so as to provide the surface flatness.

The groove G on the substrate 1 is formed, for example, spirally, or concentrically, with the land L formed between the adjacent grooves G.

In the present invention, either an embodiment with the information recorded on either one of the land L and the groove G, or a land-groove recording embodiment with the information recorded on both the land L and the groove G, can be adopted. In this case, the height difference of the land L and the groove G is set so as to hardly produce the light interaction with respect to the recording or reproduction irradiation light for the optical recording medium.

The substrate 1 can be comprised of, for example, a substrate of a heat resistant resin, such as a polyether sulfone (PES), and a polyether imide (PEI), or a glass substrate, having about a 0.3 mm to 1.2 mm thickness.

The reflection film of the film formation layer 3 has a function as a reflection layer for reflecting a recording light beam or a reproduction light beam which was incident on the optical recording medium and transmitted the recording layer of the film formation layer 3. The thickness thereof is, for example, about 50 nm to 200 nm. It can be provided as, for example, an Al film or an Al alloy film having a 100 nm film thickness.

However, the reflection film is provided with not only the above-mentioned function as a reflection film, but also a function of appropriately executing the thermal diffusion from the recording layer. Therefore, the reflection film can be comprised of a material metal having a desired reflectance and thermal conductivity, or a half-metal, a compound of a metal or a half-metal, a semiconductor and a compound thereof, other than the metal.

Moreover, in order to avoid corrosion of the reflection film by a corrosive gas contained in the air, or the like for fear of changing the optical characteristics, film formation is not executed in the vicinity of the central hole 1a and the vicinity of the outer circumference rim in the substrate 1 as mentioned above, the areas $A_0$ and $A_1$ are formed.

Furthermore, in the case the optical recording medium M is a phase change type optical recording medium, the film formation layer 3 may have a configuration comprising a phase change recording layer, and dielectric films of a light transmissible dielectric layer having a function of tolerating the recording layer deformation as provided above and below sandwiching the same.

The phase change recording layer can be comprised of materials which reversibly phase-change between, for example, an amorphous state showing a low reflectance and a crystalline state showing a high reflectance with respect to a reproduction light beam such as, in addition to a GeSbTe of a chalcogen compound, a Te, an Se, a GeTe, an InSbTe, an InSeTeAg, an InSe, an InSeTlCo, an InSbSe, a $Bi_2Te_3$, a BiSe, an $Sb_2Se_3$, and an $Sb_2Te_3$.

Moreover, the above-mentioned dielectric layers to be formed above and below the phase change recording layer, sandwiching the same can be provided, for example, as a ZnS—$SiO_2$.

Furthermore, in the case the optical recording medium M is a magneto-optic recording medium, the film formation layer 3 may have a configuration comprising the above-mentioned reflection film, a dielectric layer made of an SiN, a recording layer including a first magnetic layer made of, for example, a GdFeCo layer, and a second magnetic layer made of, for example, a TbFeCo layer, and a light transmissible dielectric layer made of, for example, an $SiO_2$ layer and an SiN layer successively formed thereon.

Then, the hydrophilic material film 11 to be formed on the film formation layer 3 is made of a hydrophilic film having a 40 [dyne/cm] or more surface tension, for example, an $SiO_2$ film formed by sputtering, an $A_2O_3$ film, an SiC film, a diamond-like carbon film or the like, such that the light transmissible flat film 4 cannot be repelled at the time of forming the light transmissible flat film 4 to be formed thereon, for example, in spin coating, and a baking step thereafter.

Accordingly, as mentioned above, since the hydrophilic material film 11 is formed by sputtering across the film formation layer 3 having the recording layer, and the non-formation area $A_0$ of the film formation layer 3, in particular, in the central part, that is, across the film formation layer 3 and the difference-in-height portion 10 at the boundary with respect to the non-formation area $A_0$ at the central part, repelling of the surface flat film 4 formed by spin coating and the baking step can be avoided effectively even at the side surface part of the difference-in-height portion 10. Furthermore, the effect functions effectively even in the case the light transmissible flat film 4 thickness is lower than the height of the difference-in-height portion 10, for example, it is 100 nm or less.

The light transmissible flat film 4 formed on the hydrophilic material layer 11 so as to fill the minute rugged surface of the film formation layer 3 is comprised of a material having a transmissivity with respect to an irradiation light toward the optical recording medium M as well as capable of providing a flat surface thereof.

The light transmissible flat film 4 is desired to be made of a spin coat material because the light transmissible flat film 4 can be formed with the excellent flatness by filling the concave-convex portion of the light transmissible flat film 4 formation surface by the film formation itself in the case of the spin coating method.

Moreover, the thickness of the light transmissible flat film 4 is set to be 400 nm or less, for example, 200 nm to 300 nm, that is, 200 nm on the land L, and 300 nm on the groove G.

Moreover, it is preferable that the light transmission flattening film 4 should be formed of a light transmission flattening material film having a formation temperature of 150° C. or less. The light transmission flattening material can be constituted by SOG (Spin On Glass) having a burning temperature of 150° C. or less and mainly containing $SiO_2$ to be an inorganic material, for example, NHC LT-101 (produced by NISSAN CHEMICAL INDUSTRIES, LTD.) to be a low temperature hard coating material.

Thus, the film formation temperature of the light transmission flattening film 4 is set to be 150° C. or less. For the substrate 1 constituting the optical recording medium, therefore, it is possible to use an organic material which is inexpensive and is excellent in mass production, and furthermore, has a lower heat resistance than that of a general inorganic material substrate. The organic material substrate can be constituted by a resin substrate formed of polyethersulfone (PES) or polyetherimide (PEI) having a high heat resistance, for example.

Furthermore, the light transmissible flat film 4 can be made of a light transmissible flat material film having a 150° C. or less formation temperature, for example, a low temperature hard coat material, NHC LT-101 (produced by Nissan Kagaku Kogyo Corp.).

By forming the light transmissible flat film 4 as a light transmissible flat material layer at a 150° C. or less formation temperature, the substrate 1 comprising the optical recording medium can be made of, in general, the above-mentioned organic material substrate that has a low heat resistance, but is excellently mass-produced at an inexpensive cost, such as a resin substrate comprising a heat resistant resin, such as a polyether sulfon (PES), and a polyether imide (PEI).

Moreover, the light transmissible flat film 4 can be formed into, for example, a multi-layer structure formed repeatedly two times or more.

The specific configuration of the optical recording medium M will be explained further, but the present invention is not limited thereto.

First, an embodiment in the case the optical recording medium M is a phase change optical recording medium will be explained.

[Phase Change Optical Recording Medium Embodiment]

Figure 2:
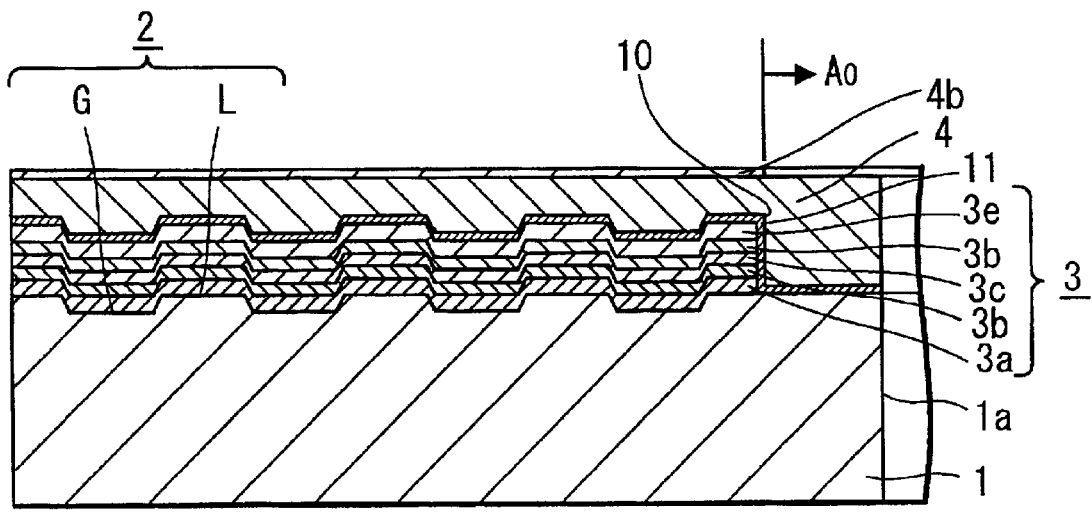
FIG. 2 is a schematic cross-sectional view of a half part of an embodiment of an optical recording medium according to the present invention.

FIG. 2 is a schematic cross-sectional view of a half part of the phase change optical recording medium. In this case, the film formation layer 3 is formed on the substrate 1 with the minute concave-convex portion 2 formed thereon including, for example, a 30 nm depth groove G, and a land L formed between the adjacent grooves G formed, except the central part non-formation area $A_0$ and the circumferential rim part ring-like non-formation area $A_1$ (not shown).

The film formation layer 3 is produced by successively forming, for example, a reflection film 3a of a 100 nm thick Al alloy film, a 20 nm thick ZnS—$SiO_2$ first dielectric film 3b, a 12 nm thick GeSbTe phase change recording layer 3c as the recording layer, a 80 nm thick ZnS—$SiO_2$ second dielectric film 3d, and a 25 nm thick SiN base layer 3e as the base layer for the light transmissible flat film 4 to be formed further on the film formation layer 3 continuously by sputtering.

The hydrophilic material film 11 is formed over the surface layer of the film formation layer 3, that is, on the base layer 3e, the side surface of the difference-in-height 10 by the non-formation area $A_0$ at the central part of the film formation layer 3, and the substrate 1 in the area $A_0$. The hydrophilic material film 11 is formed by, for example, sputtering a 2 nm thick $SiO_2$.

The light transmissible flat film 4 is formed on the hydrophilic material film 11. In this embodiment, after forming, for example, a 58 nm thick light transmissible flat film 4 by a spin coat method, a 25 nm SiN surface layer 4b is formed by sputtering.

Next, an embodiment in the case the optical recording medium M is a magneto-optic recording medium will be explained.

[Magneto-optic Recording Medium Embodiment]

Figure 3:
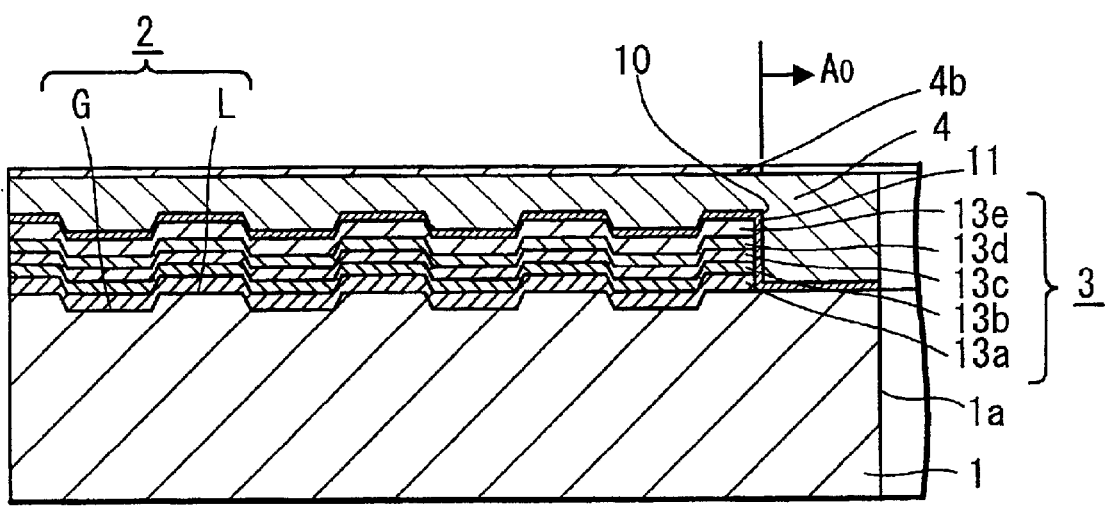
FIG. 3 is a schematic cross-sectional view of a half part of another embodiment of an optical recording medium according to the present invention.

FIG. 3 is a schematic cross-sectional view of a half part of the optical recording medium, that is, a magneto-optic recording medium. As mentioned above, the film formation layer 3 is formed on the substrate 1 with the minute concave-convex portion 2 formed thereon including, for example, a 30 nm depth groove G, and a land L formed between the adjacent grooves G formed, except the central part non-formation area $A_0$ and the circumferential rim part ring-like non-formation area $A_1$ (not shown).

The film formation layer 3 is produced by successively forming, for example, a reflection film 13a of a 100 nm thick Al alloy film, a 20 nm thick SiN first dielectric film 13b, a 3 nm thick GaFeCo first magnetic layer 13c comprising the recording layer, a 15 nm thick TeFeCo second magnetic layer 13d, and a 25 nm thick SiN base layer 13e continuously by sputtering.

Also in this embodiment, the hydrophilic material film 11 is formed over the surface layer of the film formation layer 3, that is, the base layer 13e and the non-formation area $A_0$ at the central part of the film formation layer 3 in the substrate 1 including the side surface of the difference-in-height portion 10. The hydrophilic material film 11 is formed by, for example, sputtering a 2 nm thick $SiO_2$.

The light transmissible flat film 4 is formed on the hydrophilic material film 11. Also in this embodiment, after forming, for example, a 58 nm thick light transmissible flat film 4 by a spin coat method, a 25 nm SiN surface layer 4b is formed by sputtering.

Next, a recording and reproduction device for performing near field recording and/or reproduction, to which the optical recording medium of the present invention is applied, in particular, a head part thereof will be explained.

[Recording and Reproduction Device for an Optical Recording Medium of the Present Invention]

Figure 4:
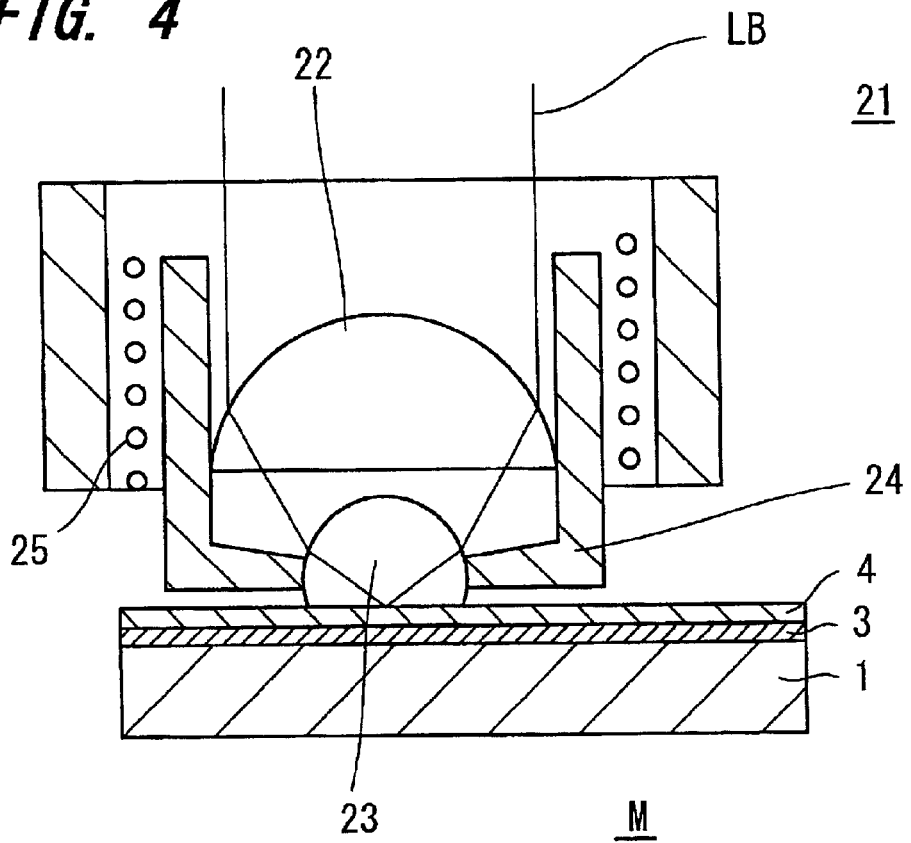
FIG. 4 is a cross-sectional view of an embodiment of a head part of a recording, reproduction device for an optical recording medium according to the present invention.

FIG. 4 is a schematic cross-sectional view of an embodiment of a head part 21. A laser beam LB is converged by an objective lens 22 so as to be incident on a solid immersion lens (SIL) 23.

A lens group comprising the objective lens 22 and the SIL 23 is held by a lens holder 24.

The lens holder 24 is movable in the optical axis direction and the in-plane direction of the optical recording medium M, for example, the disc by a electromagnetic actuator 25. Thereby, the lens group position is adjusted. Moreover, since the objective lens 22 and the SIL 23 are held by the same lens holder 24, the distance between the objective lens 22 and the SIL 23 is maintained constantly.

The SIL 23 has a shape with a part of a spherical lens cut off. It is disposed with the spherical surface side thereof facing the objective lens 22, and the flat bottom surface side facing the optical recording medium M. The SIL 23 is designed for stigmatic focusing of the laser beam LB.

The head part 21 is disposed, for example, facing the light transmissible flat film 4 side of the optical recording medium M according to the present invention as nearly as, for example, a 200 nm or less in distance for recording and/or reproduction.

Figure 5:
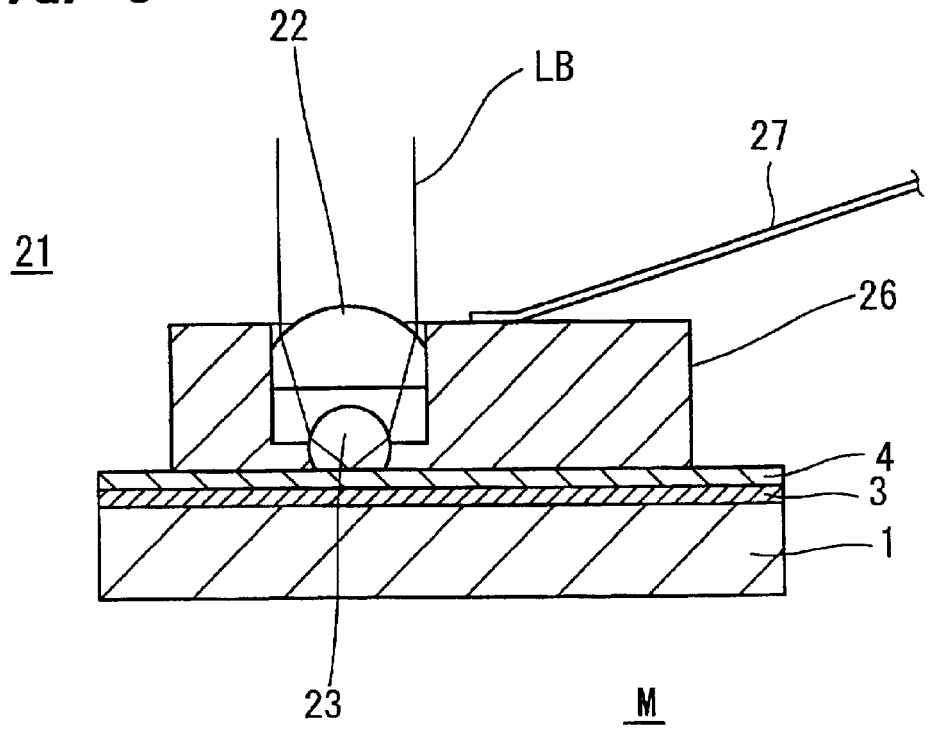
FIG. 5 is a cross-sectional view of another embodiment of a head part of a recording, reproduction device for an optical recording medium according to the present invention.

Moreover, FIG. 5 is similarly, a schematic cross-sectional view of an embodiment of another head part 21 of a near field recording and/or reproduction device with the optical recording medium M of the present invention adopted. Also in this embodiment, a laser beam LB is converged by an objective lens 22 so as to be incident on a solid immersion lens (SIL) 23.

The lens group having the objective lens 22 and the SIL 23 is mounted on a slider 26 and can be moved in the direction of a plane of the optical recording medium M through a moving mechanism (not shown) of an arm 27. In the slider 26, moreover, predetermined pressing force acts elastically toward the optical recording medium M through the arm 27, and the slider 26 floats through an air bearing by the relative migration of the optical recording medium M and an air flow generated by the rotation of the optical recording medium, for example, the optical disc so that it is opposed close to the optical recording medium.

Thus, the head portion 21 is opposed close to the light transmission flattening film 4 side of the optical recording medium M according to the present invention so that recording and/or reproduction can be carried out.

Next, a production method for an optical recording medium according to the present invention will be explained.

[Production Method for an Optical Recording Medium]

Figure 6:
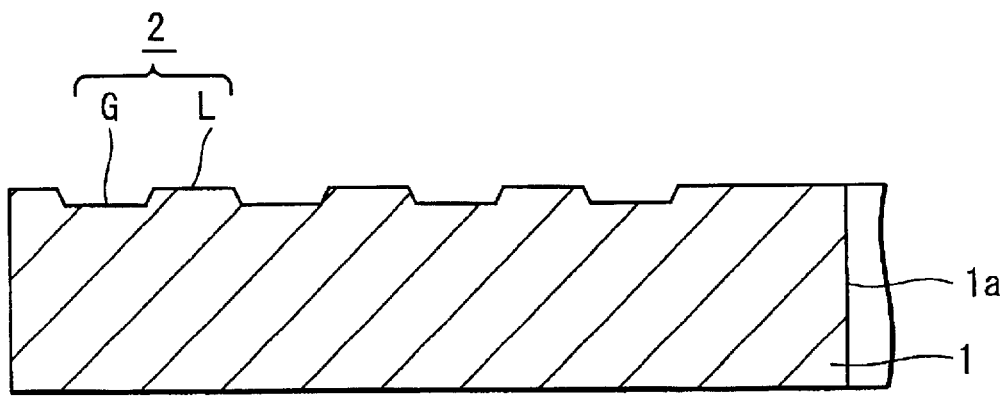
FIG. 6 is a schematic cross-sectional view of a half part of another embodiment of an optical recording medium according to the present invention.

According to a production method of the present invention, as shown in the schematic cross-sectional view of FIG. 6, a step of producing the substrate 1 having the above-mentioned minute concave-convex portion 2 formed on the surface is included.

The substrate having the minute concave-convex portion 2 is formed by, for example, injection molding of a PES, PEI resin.

Alternatively, the minute concave-convex portion 2 can be formed, for example, by a 2P (photopolymerization) method with an ultraviolet ray curing resin applied on the substrate.

Figure 7:
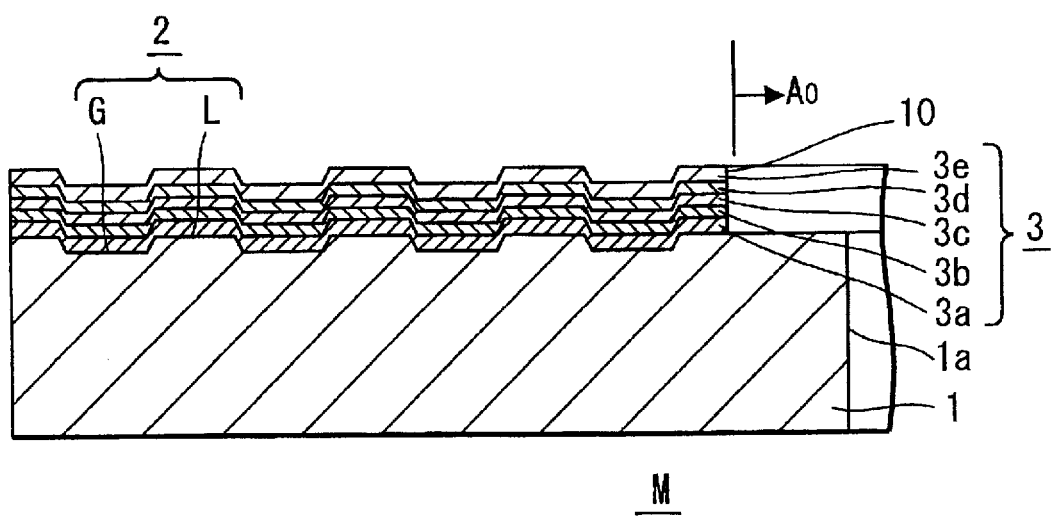
FIG. 7 is a schematic cross-sectional view of a half part of another embodiment of an optical recording medium according to the present invention.

As shown in the schematic cross-sectional view of FIG. 7, the film formation layer 3 having at least a recording layer, formed so as to produce the minute concave-convex portion reflecting the minute concave-convex portion 2 on the surface, is formed on the substrate 1, for example, by successively sputtering the above-mentioned films 3a to 3e, or 13a to 13e in each configuration.

The film formation layer 3 having the recording layer is produced by forming the film formation layer 3, for example, the constituent films 3a to 3e, or 13a to 13e with the central part including the non-formation area $A_0$ of the film formation layer 3 at the central part and the central hole 1a, and the non-formation area $A_1$ of the outer circumferential film formation layer 3 explained in FIG. 1, masked by a supporting mechanism (not shown).

For example, in the case of aiming at the phase change recording medium, as explained in FIG. 2, the film formation layer 3 is formed by successively sputtering the reflection film 3a, the first dielectric film 3b, the phase change recording layer 3c, the second dielectric film 3d, and the base layer 3e continuously.

Figure 8:
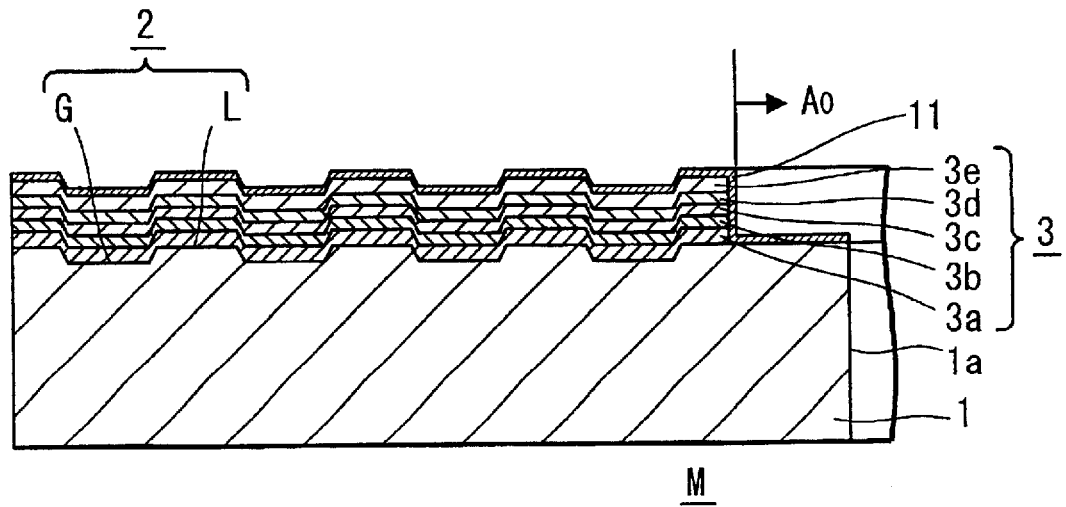
FIG. 8 is a schematic cross-sectional view of a half part of another embodiment of an optical recording medium according to the present invention.

Thereafter, as shown in the schematic cross-sectional view of FIG. 8, the hydrophilic material film 11 is formed. The hydrophilic material film 11 is formed, held by a supporting mechanism (not shown) with the non-formation area $A_1$ in the outer circumferential part of the film formation layer 3 of the substrate 1 clamped in a ring-like shape, and the formation area A of the film formation layer 3 and the non-formation area $A_0$ in the central part exposed to the outside, so as to form the hydrophilic material film 11, for example, by sputtering in the limited area of the exposed formation area A of the film formation layer 3 and the non-formation area $A_0$ in the central part exposed to the outside.

Figure 9:
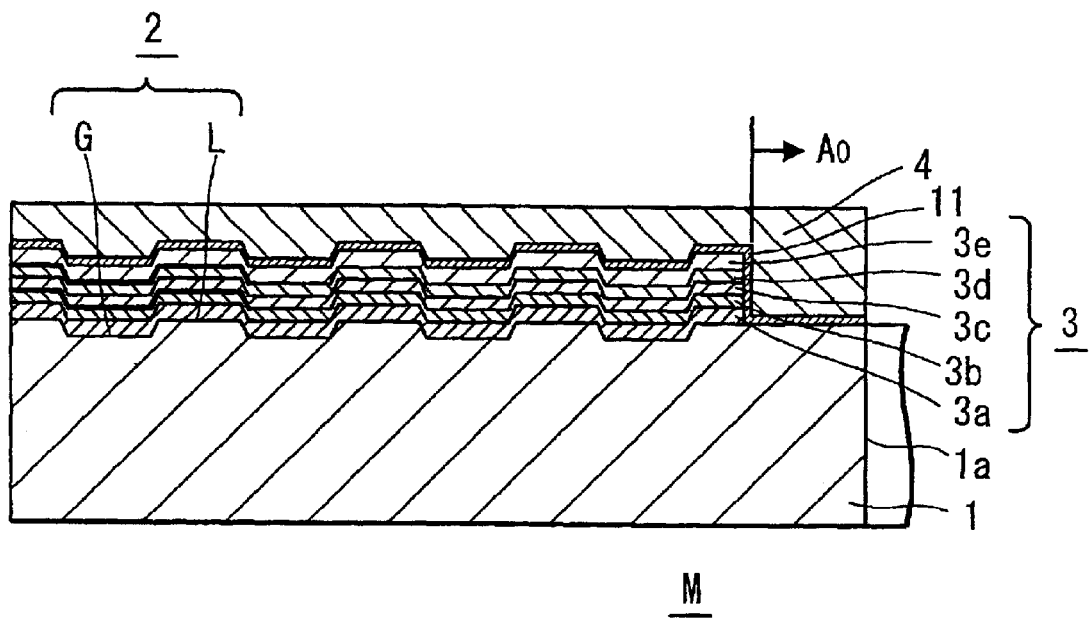
FIG. 9 is a schematic cross-sectional view of a half part of another embodiment of an optical recording medium according to the present invention.

As shown in the schematic sectional view of FIG. 9, next, the light transmission flattening film 4 is formed. The light transmission flattening film 4 is formed through the steps of carrying out normal spin coating in which a predetermined amount of an SOG liquid containing $SiO_2$ to be an inorganic material as a principal component, for example, is dropped into the outer peripheral portion of the central hole 1a of the substrate 1 to perform rotation, and subsequently, the step of curing the inorganic material by heating, for example.

For example, the NHC LT-101 (produced by NISSAN CHEMICAL INDUSTRIES, LTD.) to be a light transmission low-temperature hard coating material having a formation temperature of 150° C. or less is coated through the spin coating and the inorganic material is thus cured by the heating, for example. By setting the formation temperature to 150° C. or less, thus, the substrate 1 can be constituted by an organic material substrate which is inexpensive and has a lower thermal heat resistance than that of the inorganic material substrate.

Figure 10:
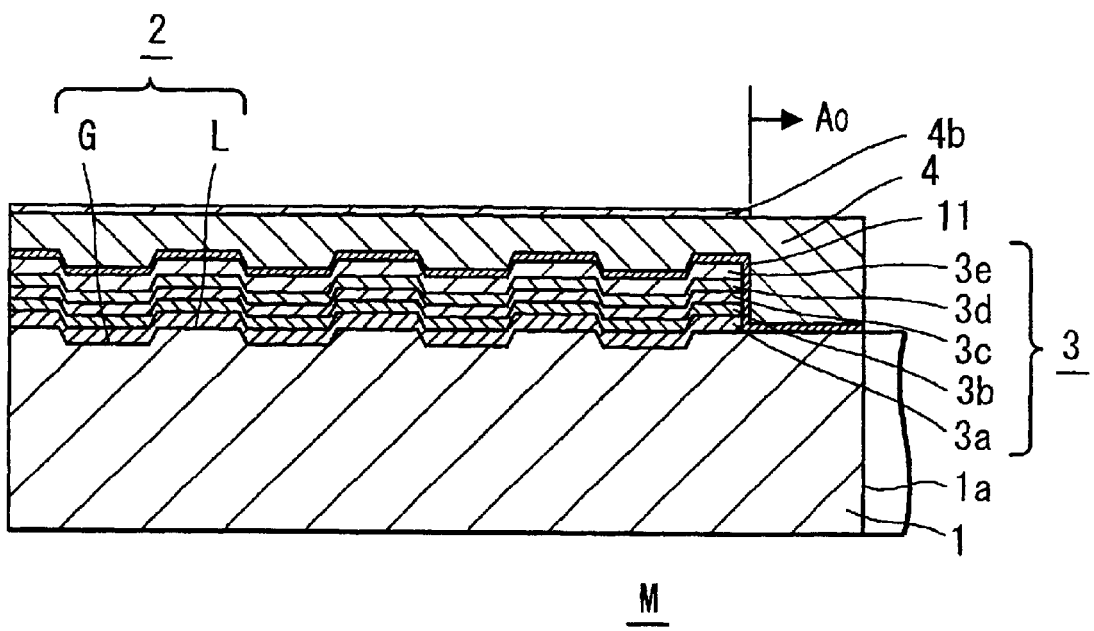
FIG. 10 is a schematic cross-sectional view of a half part of another embodiment of an optical recording medium according to the present invention.

Then, as needed, as shown in FIG. 10, the surface layer 4b is formed by, for example, a sputtering method on the light transmissible flat film 4. For the surface layer 4b formation, either of the above-mentioned holding mechanisms used for the film formation layer 3 formation or the hydrophilic material film 11 formation.

In the description of the embodiment according to the present invention, it is desirable that the hydrophilic material film 11 should also be formed in the non-formation region $A_1$ such as a recording layer in the peripheral edge portion. In the case in which the spin coating is used for the method of forming a flattening film, however, a liquid is extended from an inner periphery to an outer periphery. As compared with the inner peripheral portion, therefore, the outer peripheral portion has a lower possibility of repellency. Even if a thickness unevenness is present in the vicinity of the outer peripheral portion, furthermore, there is a very low possibility that the thickness unevenness might influence the data area of the recording medium. Therefore, even if the hydrophilic material film 11 is formed in the non-formation area $A_1$ in the recording layer in the circumferential part, it is not that problematic. However, concerning the production method of a flat film, in the case a dip method (dipping method) is used instead of the spin coat method, the risk of influence of the flat film thickness irregularity generated in the circumferential part on the data area is high, the hydrophilic material film 11 should be formed in the non-formation area $A_1$ in the recording layer in the circumferential part in that case.

Furthermore, another optical recording medium and a production method therefor will be explained.

[Another Optical Recording Medium and a Production Method fo the Optical Recording Medium]

Figure 11:
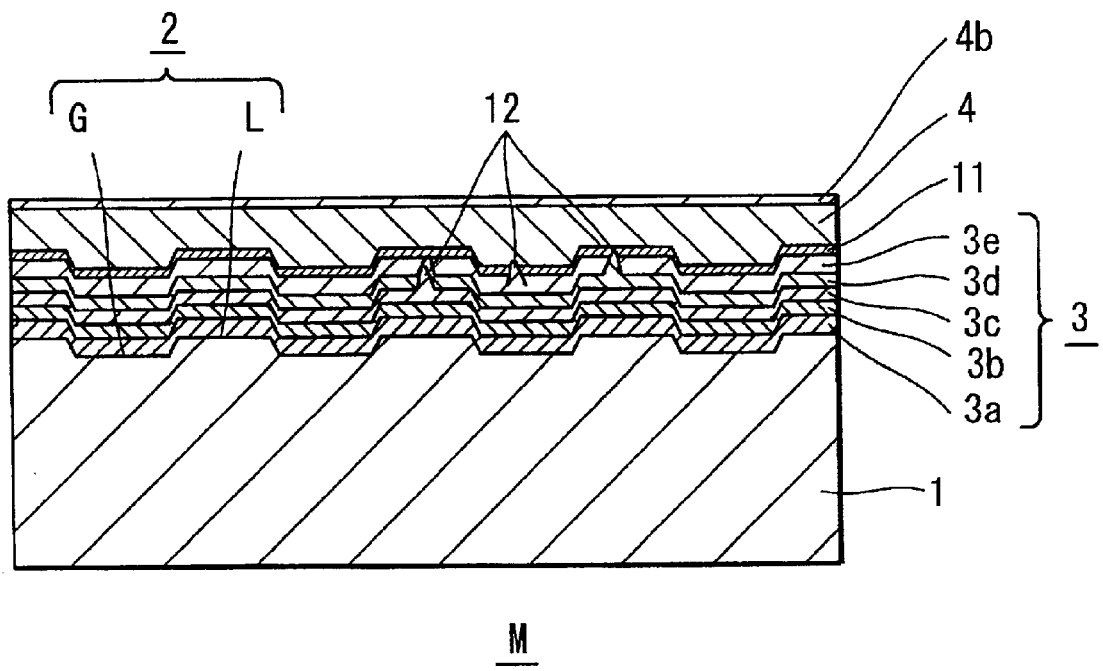
FIG. 11 is a schematic cross-sectional view of a principal part of another embodiment of an optical recording medium according to the present invention.
Figure 12:
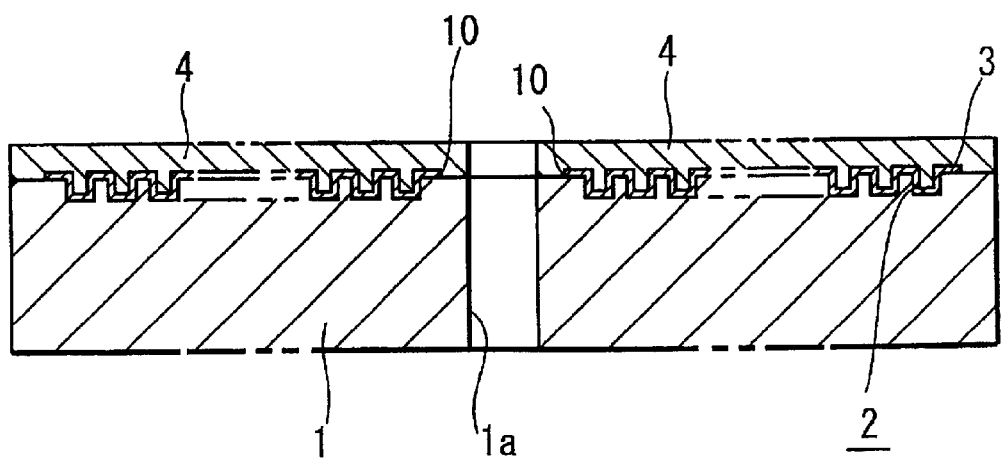
FIG. 12 is a schematic cross-sectional view of a conventional optical recording medium.

FIG. 11 shows an embodiment of the optical recording medium M. The optical recording medium M shown in FIG. 11 comprises the above-mentioned optical recording medium of the present invention explained with reference to FIG. 2, wherein surface polish is executed after formation of the base layer 11 of the transmissible flat film 4, and after formation of the surface layer 4b in the final step. That is, the film formation surface of the base layer 3e and the film formation surface of the surface layer 4b are provided as a polished surface. Thereby, the tip end of the minute needle-like projections generated in the sputtering step can be polished. The state of the remaining polished projections 12 is shown in FIG. 11.

According to the optical recording medium M of the present invention shown in FIG. 11, since the surface polish is applied as mentioned above, the risk of clash of the optical lens and the optical recording medium M is lowered at the time of recording and/or reproducing the information data by approaching the optical lens and the optical recording medium M.

Although an embodiment of providing the surface polish to the surface of the base layer 3e is described in this embodiment, since the needle-like projections generated in the sputtering step are proportional to the film formation thickness thereof, it is also possible to execute the surface polish of the hydrophilic material film 11. The effect in terms of elimination of the surface projections is the same in this case and the case of polishing the base layer 3e surface. However, in reality, since a washing step is required after executing the surface polish, in the embodiment explained with reference to FIG. 11, formation of the light transmissible flat film 4 is aimed at in the state immediately after finishing the formation of the hydrophilic material film 11 without pollution. However, in some cases, it is possible to execute the surface polish of the hydrophilic material film 11.

Moreover, such a surface polish method can be executed by an FTP (flying tape polish) method or a method of using a grind head, or the like. The polishing method is not limited in the optical recording medium according to the present invention or in the production method therefor.

As described above, according to the present invention, the formation of the hydrophilic material film 11 can prevent the repellency of the flattening film material at the spin coating and burning steps in the formation of the light transmission flattening film 4. Accordingly, it is possible to prevent a projection from being generated on the surface of the light transmission flattening film 4 due to the repellency. Thus, the optical recording medium M having an excellent plane property can be constituted. In particular, for example, in the case in which the non-film formation region $A_0$ is to be formed on a central portion in the optical disc or the like, the presence of the difference-in-height portion 10 in the non-film formation region $A_0$ of the central portion greatly produces the generation of peeling of the flattening film 4 and instability due to the spin coating. According to the structure and method of the present invention, however, stabilization can be carried out by the presence of the hydrophilic material film 11.

As to the specific effects of using the present invention, although a radial film thickness irregularity generally called stration is formed frequently at one to three portions per one sample in the case the hydrophilic material film is not formed, generation of the striation can be restrained in most cases in the case the flat film is formed by the spin coat method after forming the hydrophilic material by the above-mentioned configuration.

Therefore, the reliability of the optical recording medium M itself can be improved as well as the recording and reproduction characteristics can be stabilized, generation of the damage by the clash with the optical system in the near field recording or reproduction can be avoided owing to the improved surface flatness, or the like.

Although the hydrophilic material film 11 is formed by attaching a material film with a hydrophilic property in the above-mentioned embodiments, in some cases, the hydrophilic material film can be formed by applying a treatment of providing the hydrophilic property to the film formation layer 3, 13 surface.

Moreover, the optical recording medium with the present invention adopted, as well as the production method therefor, are not limited to the above-mentioned configurations, but it is needless to say that it can be adopted in an optical recording medium adopted in various configurations according to the use embodiment, and the purpose.

As mentioned above, according to the present invention, since repelling of the flat film, which can easily be generated in the surface flattening step, can be avoided, improvement of the reliability, and improvement of the yield can be achieved.

That is, since the surface flatness can be improved in the optical recording medium M, the stability can be improved in the near field recording and/or reproduction. That is, in the near field recording and/or reproduction device, the risk of clash of the optical recording medium and the optical lens is reduced so that the stability of the operation can be achieved and the risk of the damage of the optical system facing adjacently to the optical recording medium M can be avoided, and further, deterioration of the optical characteristics due to unevenness of the distance corresponding to the minute ruggedness, so-called air gap can be avoided.

As described above, in the manufacturing method according to the present invention, there is decreased a possibility that a defect portion such as a nonuniform film thickness might be generated due to the repellency of the flattening film. Accordingly, the yield can be enhanced and the price of the optical recording medium can be reduced.

According to the present invention, moreover, it is possible to use a light transmission flattening film having a low light absorption rate for a blue wavelength to be a short wavelength through an inorganic material. In the case in which a short wavelength, that is, a blue irradiated light is to be used in order to increase a recording density, it is possible to effectively decrease the absorption of the light irradiation in the light transmission flattening film. Consequently, a recording power can be reduced and a reproducing output can be enhanced, for example.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. An optical recording medium for carrying out at least one of record and reproduction of information by light irradiation comprising:
    a substrate having a concave-convex portion formed on a main surface on a side where the light irradiation is to be carried out;
    a film formation layer provided with a concave-convex surface corresponding to the concave-convex portion which includes at least a recording layer over the main surface of the substrate; and
    a light transmission flattening film having a transmittance to the irradiated light which is formed on the film formation layer through a hydrophilic material film;
    wherein,
        the concave-convex surface on a surface of the film formation layer is filled with the light transmission flattening film and is flattened and the substrate has a central hole,
        the film formation layer having the recording layer is formed by setting, as a non-film formation region for the film formation layer, a central part region across a predetermined width around the central hole over the substrate; and
        the hydrophilic material film is formed across the film formation layer and the non-film formation region of the central part region of the film formation layer.

2. The optical recording medium according to claim 1, wherein the light transmission flattening film is formed of a spin on glass.

3. The optical recording medium according to claim 2, wherein the spin on glass is formed of an inorganic material containing $SiO_2$ as a principal component and having a firing temperature of 150 C or less.

4. The optical recording medium according to claim 1 or 3, wherein the light transmission flattening film has a thickness of 400 nm or less.

5. The optical recording medium according to claim 1 or 3, wherein the light transmission flattening film has a thickness of 100 nm or less.

6. The optical recording medium according to claim 1, wherein the hydrophilic material film is formed by sputter by using $SiO_2$ as a principal component.

7. The optical recording medium according to claim 1, wherein the concave-convex portion has a land and a groove, and the information is recorded on the recording layer of either or both of the land and the groove.

8. A method of manufacturing an optical recording medium for carrying out at least one of record and reproduction of information by light irradiation, comprising the steps of:
    manufacturing a substrate having a concave-convex portion formed on a main surface on a side where the light irradiation is to be carried out; forming a film formation layer having at least a recording layer;
    forming a light transmission flattening film having a transmittance to the irradiated light and filling in a concave-convex surface generated on a surface of the film formation layer to flatten the surface; and
    forming a hydrophilic material film on a surface where the light transmission flattening film is to be formed before the step of forming a light transmission flattening film and
    the substrate has a central hole,
    a non-film formation region for the film formation layer across a predetermined width around the central hole over the substrate at the step of forming a film formation layer having a recording layer; and
    forming the hydrophilic material film across the film formation layer and the substrate of the non-formation region in the central part region of the film formation layer.

9. The method of manufacturing an optical recording medium according to claim 8, wherein the light transmission flattening film has a thickness of 400 nm or less.

10. The method of manufacturing an optical recording medium according to claim 8, wherein the light transmission flattening film has a thickness of 100 nm or less.

11. The method of manufacturing an optical recording medium according to claim 8, wherein the hydrophilic material film is formed by sputtering.

12. The method of manufacturing an optical recording medium according to claim 11, wherein the hydrophilic material film is formed by clamping an outer periphery of the substrate.

13. The method of manufacturing an optical recording medium according to claim 11, wherein the hydrophilic material film is formed of a film formation material containing $SiO_2$ as a principal component.

14. An optical recording medium for carrying out at least one of record and reproduction of information by light irradiation, comprising:
   a substrate having a concave-convex portion formed on a main surface on a side where the light irradiation is to be carried out;
   a film formation layer provided with a concave-convex surface corresponding to the concave-convex portion which includes at least a recording layer over the main surface of the substrate; and
   a light transmission flattening film having a transmittance to the irradiated light which is formed on the film formation layer through a hydrophilic material film;
   wherein,
      the concave-convex surface on a surface of the film formation layer is filled with the light transmission flattening film and is thus flattened,
      the light transmission flattening film is formed of a spin on glass,
      the spin on glass is formed of an inorganic material containing $SiO_2$ as a principal component and having a firing temperature of 150° C. or less, and the substrate is formed of polyethersulfone.

15. An optical recording medium for carrying out at least one of record and reproduction of information by light irradiation, comprising:
   a substrate having a concave-convex portion formed on a main surface on a side where the light irradiation is to be carried out;
   a film formation layer provided with a concave-convex surface corresponding to the concave-convex portion which includes at least a recording layer over the main surface of the substrate; and
   a light transmission flattening film having a transmittance to the irradiated light which is formed on the film formation layer through a hydrophilic material film;
   wherein,
      the concave-convex surface on a surface of the film formation layer is filled with the light transmission flattening film and is thus flattened
      the light transmission flattening film is formed of a spin on glass
      the spin on glass is formed of an inorganic material containing $SiO_2$ as a principal component and having a firing temperature of 150° C. or less, and
      the substrate is formed of poletherimide.

16. A method of manufacturing an optical recording medium for carrying out at least one of record and reproduction of information by light irradiation, comprising the steps of:
   manufacturing a substrate having a concave-convex portion formed on a main surface on a side where the light irradiation is to be carried out;
   forming a film formation layer having at least a recording layer;
   forming a light transmission flattening film having a transmittance to the irradiated light and filling in a concave-convex surface generated on a surface of the film formation layer to flatten the surface; and
   forming a hydrophilic material film on a surface where the light transmission flattening film is to be formed before the step of forming a light transmission flattening film;
   wherein,
      the substrate has a central hole,
      a non-film formation region for the film formation layer across a predetermined width around the central hole over the substrate at the step of forming a film formation layer having a recording layer,
      forming the hydrophilic material film across the film formation layer and the substrate of the non-formation region in the central part region of the film formation layer, and the light transmission flattening film is formed by spin coating.

17. A method of manufacturing an optical recording medium for carrying out at least one of record and reproduction of information by light irradiation, comprising the steps of:
   manufacturing a substrate having a concave-convex portion formed on a main surface on a side where the light irradiation is to be carried out;
   forming a film formation layer having at least a recording layer;
   forming a light transmission flattening film having a transmittance to the irradiated light and filling in a concave-convex surface generated on a surface of the film formation layer to flatten the surface;
   forming a hydrophilic material film on a surface where the light transmission flattening film is to be formed before the step of forming a light transmission flattening film;
   wherein,
      the substrate has a central hole,
      a non-film formation region for the film formation layer across a predetermined width around the central hole over the substrate at the step of forming a film formation layer having a recording layer,
      forming the hydrophilic material film across the film formation layer and the substrate of the non-formation region in the central part region of the film formation layer,
      the light transmission flattening film is formed by spin coating, and
      the light transmission flattening film is formed of a spin on glass material containing $SiO_2$ as a principal component and having a firing temperature of 150° C. or less.

18. A method of manufacturing an optical recording medium for carrying out at least one of record and reproduction of information by light irradiation, comprising the steps of:
   manufacturing a substrate having a concave-convex portion formed on a main surface on a side where the light irradiation is to be carried out;
   forming a film formation layer having at least a recording layer;
   forming a light transmission flattening film having a transmittance to the irradiated light and filling in a concave-convex surface generated on a surface of the film formation layer to flatten the surface; and forming a hydrophilic material film on a surface where the light transmission flattening film is to be formed before the step of forming a light transmission flattening film;

wherein, the substrate has a central hole, a non-film formation region for the film formation layer across a predetermined width around the central hole over the substrate at the step of forming a film formation layer having a recording layer, forming the hydrophilic material film across the film formation layer and the substrate of the non-formation region in the central part region of the film formation layer, the light transmission flattening film is formed by spin coating, the light transmission flattening film is formed of a spin on glass material containing SiO$_2$ as a principal component and having a firing temperature of 150° or less, and the substrate is constituted by an organic material, and the light transmission flattening film is formed by firing at 150 C or less.

19. A method of manufacturing an optical recording medium for carrying out at least one of record and reproduction of information by light irradiation, comprising the steps of:

manufacturing a substrate having a concave-convex portion formed on a main surface on a side where the light irradiation is to be carried out;

forming a film formation layer having at least a recording layer;

forming a light transmission flattening film having a transmittance to the irradiated light and filling in a concave-convex surface generated on a surface of the film formation layer to flatten the surface; and forming a hydrophilic material film on a surface where the light transmission flattening film is to be formed before the step of forming a light transmission flattening film;

wherein, the substrate has a central hole, a non-film formation region for the film formation layer across a predetermined width around the central hole over the substrate at the step of forming a film formation layer having a recording layer, forming the hydrophilic material film across the film formation layer and the substrate of the non-formation region in the central part region of the film formation layer, the light transmission flattening film is formed by spin coating, the light transmission flattening film is formed of a spin on glass material containing SiO$_2$ as a principal component and having a firing temperature of 150° C. or less, the substrate is constituted by an organic material, and the light transmission flattening film is formed by firing at 150° C. or less, and the substrate is formed of polyethersulfone.

20. A method of manufacturing an optical recording medium for carrying out at least one of record and reproduction of information by light irradiation, comprising the steps of:

manufacturing a substrate having a concave-convex portion formed on a main surface on a side where the light irradiation is to be carried out;

forming a film formation layer having at least a recording layer;

forming a light transmission flattening film having a transmittance to the irradiated light and filling in a concave-convex surface generated on a surface of the film formation layer to flatten the surface;

forming a hydrophilic material film on a surface where the light transmission flattening film is to be formed before the step of forming a light transmission flattening film;

wherein, the substrate has a central hole, a non-film formation region for the film formation layer across a predetermined width around the central hole over the substrate at the step of forming a film formation layer having a recording layer, forming the hydrophilic material film across the film formation layer and the substrate of the non-formation region in the central part region of the film formation layer, the light transmission flattening film is formed by spin coating, the light transmission flattening film is formed of a spin on glass material containing SiO$_2$ as a principal component and having a firing temperature of 150° C. or less, the substrate is constituted by an organic material, and the light transmission flattening film is formed by firing at 150° C. or less, and the substrate is formed of poletherimide.

* * * * *